US008493450B2

(12) United States Patent
Shiraiwa

(10) Patent No.: US 8,493,450 B2
(45) Date of Patent: Jul. 23, 2013

(54) CAMERA, PRINTER, PRINT SYSTEM, CONTROL METHOD, MEMORY MEDIUM AND PROGRAM THEREFOR

(75) Inventor: Yoshinobu Shiraiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 11/756,167

(22) Filed: May 31, 2007

(65) Prior Publication Data

US 2007/0223046 A1  Sep. 27, 2007

Related U.S. Application Data

(62) Division of application No. 10/061,155, filed on Feb. 4, 2002, now abandoned.

(30) Foreign Application Priority Data

Feb. 7, 2001  (JP) .................................. 2001-031248

(51) Int. Cl.
 *H04N 3/14* (2006.01)
(52) U.S. Cl.
 USPC .............. 348/207.2; 348/333.01; 348/333.02; 358/1.15; 358/1.16; 396/297
(58) Field of Classification Search
 USPC ............ 348/207.2, 333.01, 333.02; 358/1.15; 358/1.16; 396/297
 See application file for complete search history.

(56) References Cited

U.S. PATENT DOCUMENTS

| 5,717,496 | A | 2/1998 | Satoh et al. .................. 358/402 |
| 5,784,581 | A | 7/1998 | Hannah |
| 5,793,367 | A | 8/1998 | Taguchi ....................... 345/330 |
| 5,806,072 | A | 9/1998 | Kuba et al. ................... 707/200 |
| 5,815,080 | A | 9/1998 | Taguchi ....................... 340/635 |
| 5,844,606 | A | 12/1998 | Suemoto et al. .............. 348/375 |
| 5,847,836 | A | 12/1998 | Suzuki ......................... 358/296 |
| 5,914,787 | A | 6/1999 | Satoh et al. .................. 358/402 |
| 6,075,566 | A | 6/2000 | Suemoto et al. .............. 348/372 |
| 6,111,662 | A | 8/2000 | Satoh et al. .................. 358/442 |
| 6,151,067 | A | 11/2000 | Suemoto et al. .............. 348/207 |
| 6,288,792 | B1 | 9/2001 | Yoshida et al. .............. 358/1.15 |
| 6,377,294 | B2 * | 4/2002 | Toyofuku et al. .............. 348/36 |
| 6,559,963 | B1 | 5/2003 | Kamimura ................... 358/1.15 |
| 6,563,542 | B1 | 5/2003 | Hatakenaka et al. .... 348/333.02 |
| 6,580,460 | B1 | 6/2003 | Takahashi et al. |
| 6,583,893 | B1 | 6/2003 | Satoh et al. .................. 358/402 |
| 6,618,553 | B1 * | 9/2003 | Shiohara ...................... 386/117 |
| 6,657,657 | B1 | 12/2003 | Sato .......................... 348/207.2 |
| 6,771,896 | B2 * | 8/2004 | Tamura et al. ................ 396/57 |

(Continued)

FOREIGN PATENT DOCUMENTS

| CN | 1276882 | 12/2000 |
| EP | 0 862 313 | 2/1998 |

(Continued)

OTHER PUBLICATIONS

Mar. 2, 2012 European Search Report in European Patent Appln. No. 02250783.4.

*Primary Examiner* — Peter K Huntsinger

(74) *Attorney, Agent, or Firm* — Fitzpatrick, Cella, Harper & Scinto

(57) ABSTRACT

The invention provides a system capable of printing in a simple manner by detecting the connection of a printer and shifting to a print mode in response to the detection of the printer.

9 Claims, 11 Drawing Sheets

U.S. PATENT DOCUMENTS

| | | | |
|---|---|---|---|
| 6,912,060 B1 | 6/2005 | Luciano et al. | 358/1.15 |
| 6,930,717 B1 | 8/2005 | Kobayashi et al. | 348/333.02 |
| 6,947,075 B1 | 9/2005 | Niikawa | 348/211.14 |
| 6,963,359 B1 | 11/2005 | Aosaki et al. | 348/207.2 |
| 7,173,721 B1 * | 2/2007 | Kobayashi et al. | 358/1.15 |
| 2006/0044397 A1 | 3/2006 | Satoh et al. | 348/207.99 |

FOREIGN PATENT DOCUMENTS

| | | |
|---|---|---|
| EP | 0 860 980 | 8/1998 |
| EP | 0 944 247 | 9/1999 |
| JP | 5-46245 | 2/1993 |
| JP | 6-153188 | 5/1994 |
| JP | 6-205409 | 7/1994 |
| JP | 6-217175 | 8/1994 |
| JP | 6-343137 | 12/1994 |
| JP | 7-135631 | 5/1995 |
| JP | 7-249113 | 9/1995 |
| JP | 9-65182 | 3/1997 |
| JP | 9-322032 | 12/1997 |
| JP | 10-100514 | 4/1998 |
| JP | 10-243327 | 9/1998 |
| JP | 10-271377 | 10/1998 |
| JP | 10-301547 | 11/1998 |
| JP | 11-8792 | 1/1999 |
| JP | 11-017993 | 1/1999 |
| JP | 11-46331 | 2/1999 |
| JP | 11-88742 | 3/1999 |
| JP | 11-88815 | 3/1999 |
| JP | 11-122563 | 4/1999 |
| JP | 11-252489 | 9/1999 |
| JP | 11-266384 | 9/1999 |
| JP | 11-306119 | 11/1999 |
| JP | 11-308433 | 11/1999 |
| JP | 2000-225754 | 8/2000 |
| JP | 2000-278550 | 10/2000 |
| JP | 2000-286875 | 10/2000 |
| JP | 2000-353145 | 12/2000 |
| KR | 1999-0044165 | 6/1999 |
| KR | 2000-0032918 | 6/2000 |
| WO | WO 97/50243 | 12/1997 |

* cited by examiner

CAMERA, PRINTER, PRINT SYSTEM, CONTROL METHOD, MEMORY MEDIUM AND PROGRAM THEREFOR

This application is a division of U.S. patent application Ser. No. 10/061,155, filed Feb. 4, 2002, now pending.

BACKGROUND OF THE INVENTION

1. Field of the Invention

The present invention relates to a camera for recording an image, a printer for printing an image, and a print system composed thereof.

2. Related Background Art

There is conventionally known a printer of line thermal transfer system employing a heat-sensitive sheet as the printing sheet and selectively driving plural heat generating members arranged in the main scanning direction, thereby printing a dotted line on the sheet by conveying the sheet in the sub scanning direction.

With the recent progress in the image input device such as the digital camera, digital video camera or scanner, the printer device of thermal transfer system is attracting attention as the printing means.

This is because the printer of the thermal transfer system is capable of providing a smooth image of high quality since controllable heat level can be easily changed in each pixel, so that plural gradation levels can be obtained for each pixel. Also the performance of the thermal head and that of the printing sheet have progressed to provide an image print comparable to the print of silver halide photography in image quality, and such printer is attracting attention for printing a photographic image together with the recent progress in digital cameras.

Consequently there is being commercialized a system in which such printing apparatus and an image pickup apparatus such as a digital camera or a digital video camera are directly connected or integrally constructed to print the taken image information without going through a device for processing the image information such as a computer.

Such system enables to easily achieve photographic printout of the image information from the digital camera or digital video camera and is very convenient.

As an example, the Japanese Patent Application Laid-Open No. 9-65182 discloses an image input-output system capable of achieving input and output in an integral configuration. Such composite camera integrally includes image pickup means provided with an electronic view finder and capable of recording the image information on a recording medium, and print means for printing the image information on a recording sheet, and is also provided with control means for interrupting the electric power supply to the above-mentioned electronic view finder while the print means prints the image information on the recording sheet. Such configuration is effective for saving the electric power since the electric power is not supplied to the electronic view finder during the printing operation, so that the user can easily use the system without worrying about the electric power supply.

Also the Japanese Patent Application Laid-Open No. 10-243327 describes the connection between an image input apparatus and an image output apparatus. There is disclosed an image input-output system consisting of an image output apparatus and an image input apparatus, wherein the image output apparatus is capable of receiving and outputting the image signal from the image input apparatus and is provided with a power supply unit for supplying the image input apparatus with electric power, while the image input apparatus is connected with the image output apparatus by a connection cable for transmitting the image data to the image output apparatus and for receiving the electric power supply from the image output apparatus. The image input apparatus is provided with discrimination means for electric power supply and a power supply unit, and is capable of using the electric power from the image output apparatus or that from the power supply unit utilizing the discrimination means. Since the electric power can be supplied from the image output apparatus, the print output operation can be executed without attention being paid to the remaining electric power of the image input apparatus such as the digital camera, so that the user can easily use the image input-output apparatus without worrying about the electric power supply.

Also the image output apparatus employed in the above-described image input-output apparatus can generally adapt to apparatuses different from the above-mentioned image input apparatus, and can be connected, for example, to a digital camera by an exclusive connection cable as explained in the foregoing or to a personal computer by an ordinary print cable (serial or parallel). Thus the user can use a single image output apparatus for the image output for a digital camera or as the printer of a personal computer.

Also the camera is connected with the printer or the computer utilizing USB (universal serial bus).

However, such conventional example does not provide a satisfactory solution in compactization, cost, speed, convenience of use etc. in sufficient manner in case a system is constructed with a printer apparatus and an image input apparatus such as a digital camera.

In particular, certain preparation are required until the printing operation can be executed, so that the print can be easily obtained.

For example, in order to executing a printing operation by a print instruction from the digital camera, it is required to connect the printer apparatus to the digital camera, then to confirm that the printing is enabled, to set the digital camera at a print mode and to provide the print instruction in such print mode.

Also in case the printer is connectable not only to the digital camera but also to a personal computer or the like, it is necessary, in such printer, to set that the connection is made to the digital camera. Consequently there is required a procedure of executing such setting in the digital camera in the digital camera, so that it is furthermore difficult to obtain the print easily.

Furthermore, in case of utilizing the USB, the connector of the host (master) and the connector of the function (slave: peripheral device) are mutually different in shape, so that, in case of USB connection with a printer constituting a new function with the camera provided with a connector for USB connection with a host, the camera has to be additionally provided with a connector for printer connection.

SUMMARY OF THE INVENTION

In consideration of the foregoing, an object of the present invention is to provide a camera capable of shifting to the print mode by connection with a printer and enabling to simply obtain a print in such mode.

Another object of the present invention is to provide a printer not requiring to provide a camera, equipped with a connector for connection with a host, newly with a connector for connection with the printer.

The above-mentioned objects can be attained, according to the present invention, by a camera comprising detection means for detecting the connection with a printer and shift means for shifting to a print mode in response to the detection of connection with a printer by the detection means.

According to the present invention, there is also provided a printer comprising identification means for identifying whether there is connected a cable for connection with a device serving as a host or a cable for connection with a device serving as a function, and setting means for setting as a host or a function according to the result of identification by the identification means.

DESCRIPTION OF THE PREFERRED EMBODIMENTS

Now the present invention will be clarified in detail by embodiments thereof, with reference to the accompanying drawings.

The present print system employs a printer unit of thermal transfer recording system of sublimation type and is capable of printing an arbitrary number of prints of electronic image information. Such print system will be explained in detail in the following.

At first there will be explained an embodiment of the ordinary thermal transfer printer relating to the present invention, with reference to the accompanying drawings. Then there will be explained a print mode in the system.

Figure 1:
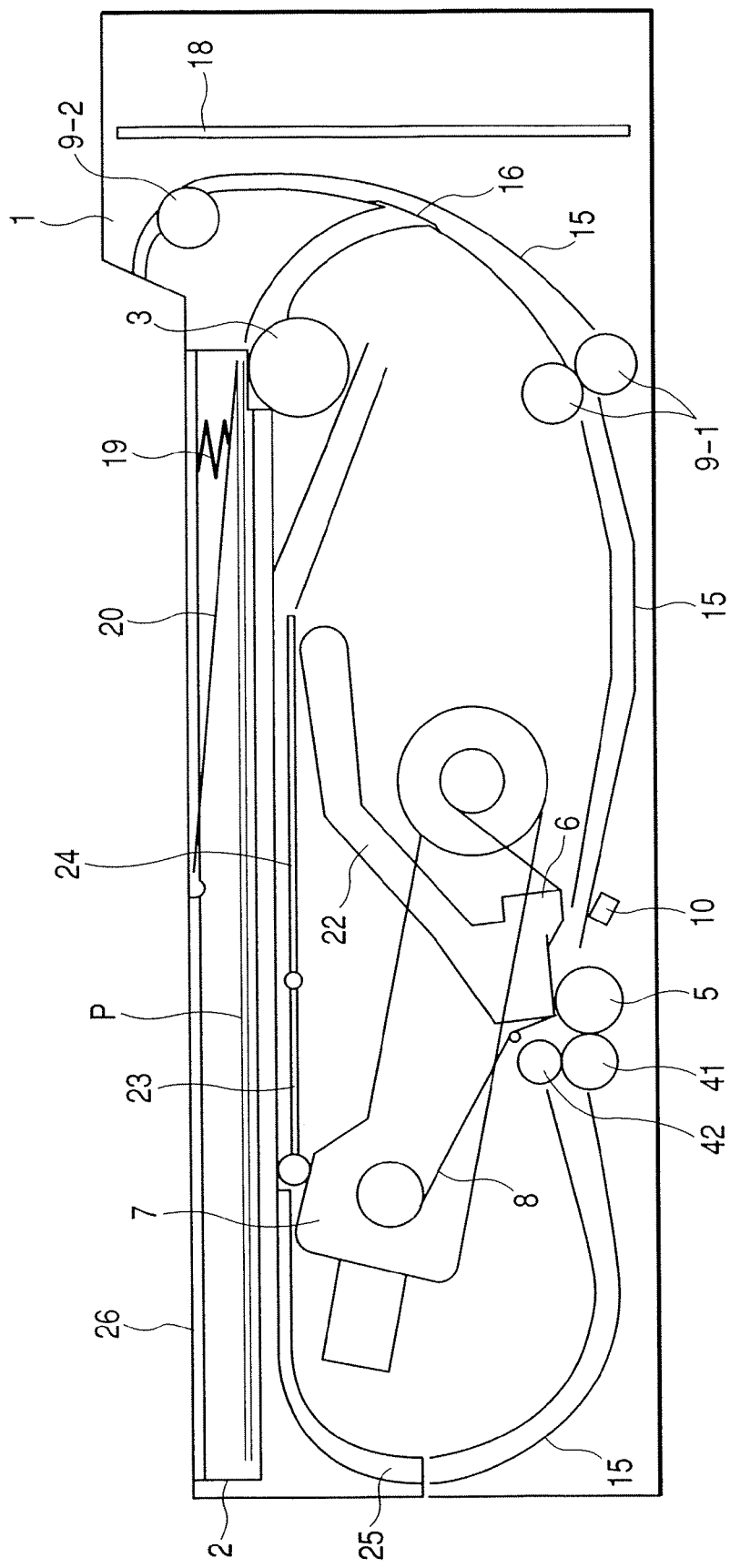
FIG. 1 is a schematic view showing the configuration of a first embodiment.

FIG. 1 is a schematic lateral view showing the configuration of a printer embodying the present invention. In the entire configuration of the printer, a recording sheet P is separated and fed one by one by a feeding roller 3 into the main body 1 of the apparatus from a sheet cassette 2 in which the recording sheets are stacked. The recording sheets P are maintained in contact with the feeding roller 3 by a push-up plate 21 biased by a spring 20. The recording sheet P conveyed by the feeding roller 3 is pinched by paired conveying rollers 4 and is rendered capable of reciprocating through a recording unit. The paired conveying rollers 4 is composed of a pinch roller 42 and a grip roller 41.

In the recording unit, the platen roller 5 and a thermal head 6 generating heat according to the recording information are mutually opposed across the conveying path of the recording sheet, and an ink sheet 8, contained in an ink cassette 7 and provided with an ink layer consisting of thermally fusible or thermally sublimable ink and an overcoat layer coated on the printing surface for protecting the same, is pressed by the thermal head 6 to the recording sheet P and is selectively heated to execute transfer recording a desired image onto the recording sheet P and overcoating a protective layer thereon.

The above-mentioned ink sheet is provided with ink layers of yellow (Y), magenta (M) and cyan (C) and an overcoat layer (OP) in mutually adjacent positions so as to cover the print area of the recording sheet P, each layer having a size substantially equal to the print size, and the recording sheet P is returned to a recording start position P1 after thermal transfer of each layer whereby the layers are transferred in succession and in mutually overlaid manner.

Therefore the recording sheet P is reciprocated by the paired conveying rollers 4 by the number of the ink layers and the overcoat layer.

In this operation, the recording sheet P after the printing of each ink layer is in front of the main body 1 of the apparatus, and is guided to behind the main body 1, through a guide portion in front of and under the sheet cassette. Since the recording sheet is inverted in front of the apparatus, there can be avoided drawbacks resulting from the external exposure of the recording sheet P in the source of printing, such as waste in the space or unintended contact with the recording sheet, and there can be saved the space for installation.

Also since the lower part of the sheet cassette 2 is directly utilized as the sheet guide, there can be reduced the thickness of the main body 1 of the apparatus. Also the recording sheet P is passed in a space between the ink cassette 7 and the sheet cassette 2 to minimize the total height of the main body 1, there enabling compactization thereof.

A sheet conveying guide portion 25 of the sheet cassette 2 serves to invert the recording sheet P, inverted in and conveyed from front of the main body 1, to the rear of the main body, and is provided on the sheet cassette 2 to significantly contribute to the compactization of the entire main body 1 of the apparatus.

Also the upper surface of the sheet cassette 2 is used as a tray portion for the recording sheet P discharged after printing, and such configuration also contributes to the compactization of the main body 1 of the apparatus.

After the printing with the ink layers, the recording sheet P is is guided to discharge rollers 1, 9-1, 2, 9-2 and is discharged in a direction from the rear part to the front part of the main body 1 whereby the recording operation is terminated.

The discharge roller 1 is brought into contact with the recording sheet P only at the discharging operation thereof but is not stressed during the printing operation.

The main body 1 of the apparatus is provided with a guide portion 15 for guiding the recording sheet P.

A conveying path switching sheet 16 serves to guide the recording sheet P to a path of discharge side once it is fed.

The thermal head 6 for printing is provided integrally on a head arm 22 and is retracted to a position not hindering the extraction or insertion of the ink cassette 7 at the replacement thereof.

Such replacing operation is enabled by extracting the sheet cassette 2, and, in such operation, in linkage with the attaching-detaching operation of the sheet cassette 2, a head arm 22 is moved vertically to achieve the retracting operation by the retraction of a cam portion 2-1 of the sheet cassette from a state pressed by a cam portion 22-1.

Figure 3:
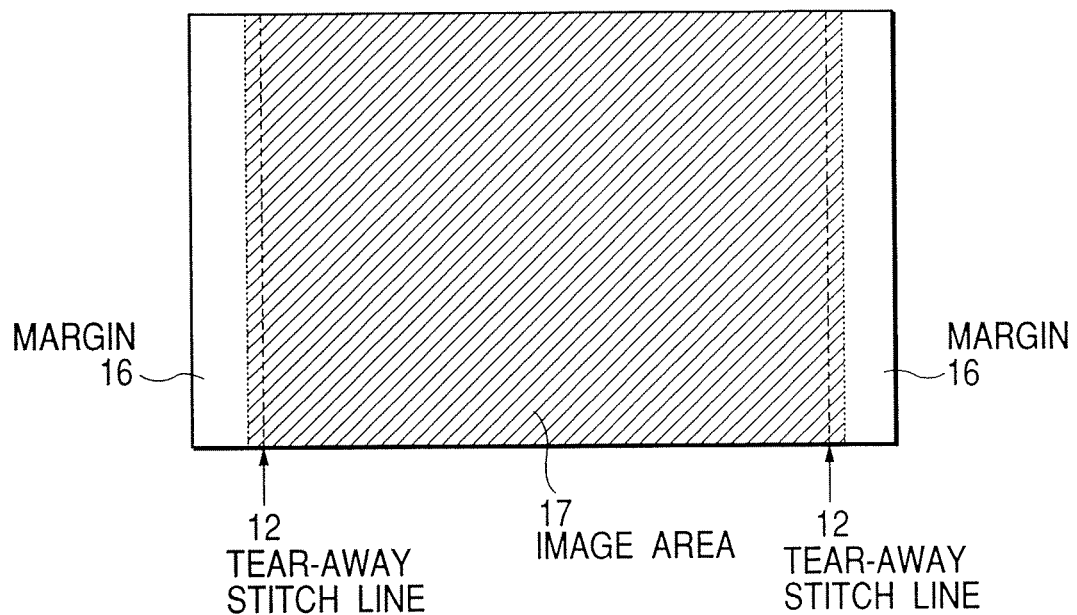
FIG. 3 is a view showing a sheet to be employed in the first embodiment.

In the ordinary thermal transfer printer, since three colors of Y, M and C are recorded in plane-sequential manner, there is required control for exactly matching the recording front ends of the respective colors. For this purpose, it is necessary to tightly grip and convey the recording sheet P by the paired conveying rollers 4. Therefore an unrecordable margin is required in the end portion of the recording sheet P in the conveying direction thereof. In consideration of this fact and in order to easily obtain a margin-free final print, the recording sheet P is provided, as shown in FIG. 3, with stitch hole lines for manually tearing off later the marginal portions which are firmly gripped by the paired conveying rollers 4 at the start of recording and cannot be used for recording.

The present invention is executed with the recording sheet P provided with the above-described tear-off stitch lines and a thermal transfer printer, and the area of the stitch line areas of the above-described recording sheet are to be overcoated.

Also a diagonally hatched area indicates the print area and the control is so made as to execute printing in an area including the stitch line areas. The overcoat is made substantially in the print area but is so controlled as to be slightly larger than and to include the print area.

In the following there will be further explained the details of the apparatus.

Figure 4:
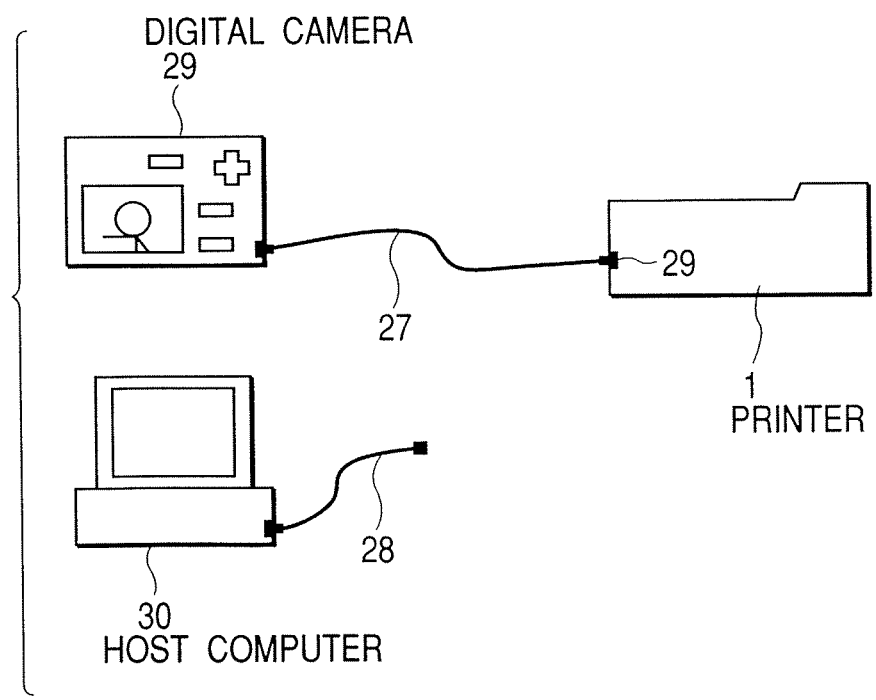
FIG. 4 is a view showing the connection state of the first embodiment.

In the printer 1 shown in FIG. 1, the paired conveying rollers 4 is composed of the pinch roller 42 and the grip roller 41, and the grip roller 41 is connected to a reducing mechanism to the output shaft of a stepping motor and is reversibly driven by the rotation control of the stepping motor. Since the recording sheet P is firmly pinched and reciprocated by the paired conveying rollers 4, the recording sheet P is also conveyed under exact position control by the rotation drive of the stepping motor. As an example, in case the recording pitch of a line by the thermal head 6 is 85 •m and the stepping motor has 4 steps for conveying the recording sheet P by a line, the recording sheet P can be conveyed by a line (namely 85 •m) by the rotation control of 4 steps of the stepping motor. In case the print area shown in FIG. 4 is 144 mm in the conveying direction, there can be printed 1694 lines and the recording sheet P can be conveyed by a corresponding amount by the rotation of 6776 steps of the stepping motor.

In the printer 1 shown in FIG. 1, a sensor 10 for detecting the leading end of the recording sheet is positioned in the vicinity of the paired feeding rollers 4 when seen from the direction of the feeding roller 3, thereby detecting the leading end of the recording sheet and, after detection, advancing the recording sheet by a predetermined number of lines and stopping it in a position supportable by the paired conveying rollers 4. Such position becomes the aforementioned recording start position. In such position, the thermal head is driven according to the recording information, starting from the yellow (Y) color to be recorded first, to record the image of respective color or to transfer the overcoat layer. After the recording of each color, the recording sheet is conveyed back toward the discharge rollers 9 by a predetermined number of lines, and such procedure is repeated four times for the transfers of Y, M, C colors and of the overcoat layer.

In the printer 1 shown in FIG. 1, the distance between the platen roller 5 and the pressing position of the thermal head 6 on the recording sheet P is selected as 20 mm on the recording sheet in consideration of the arrangement of components within the apparatus, but such distance is naturally not restrictive.

The print shown in FIG. 3 can be obtained by transfer recording of the respective colors and of the overcoat layer as will be explained in the following.

Figure 2:
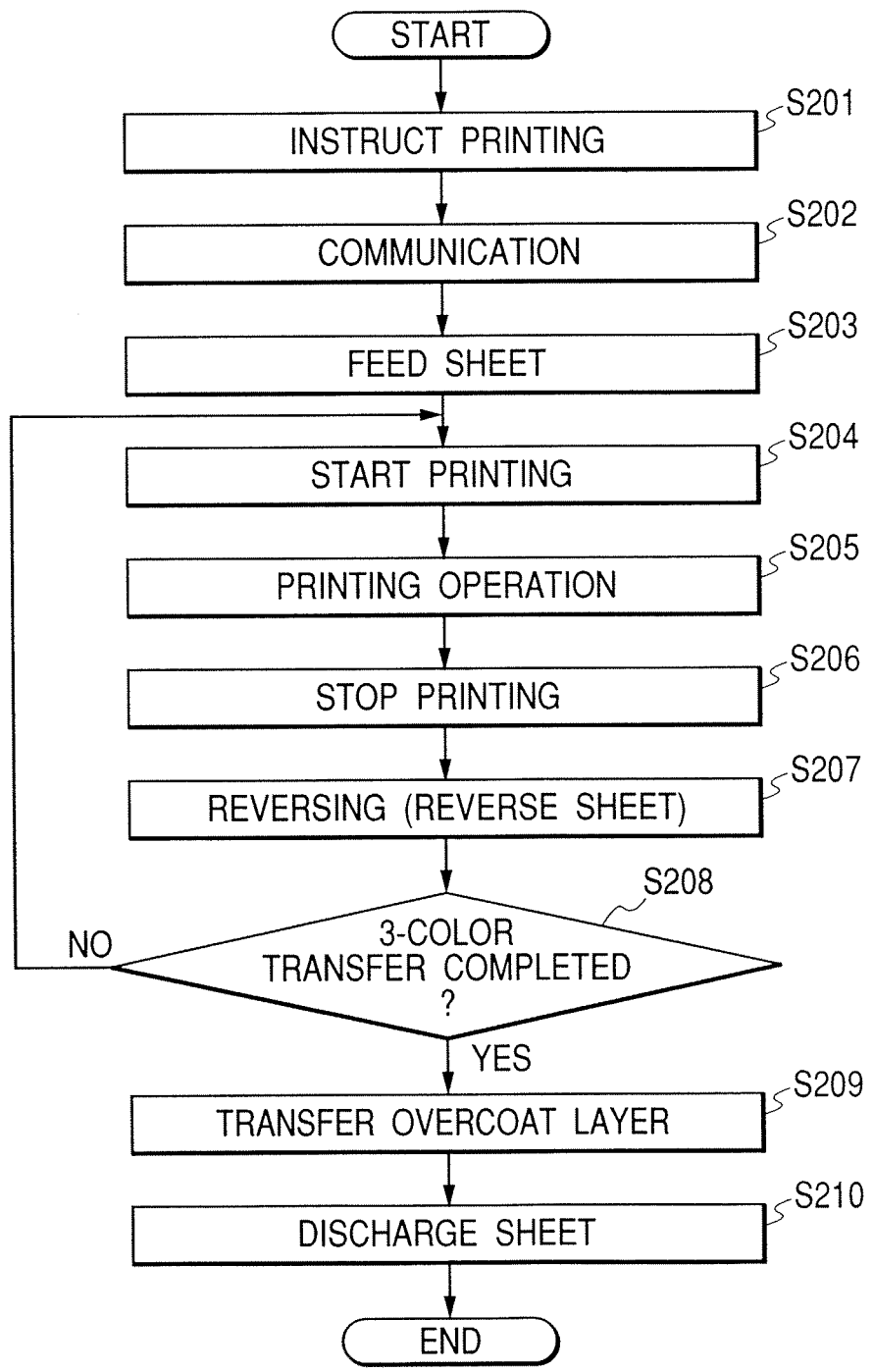
FIG. 2 is a flow chart 1 of the first embodiment.

Now reference is made to FIG. 2 for explaining the sequence of color ink transfer and overcoating in case of printing a sheet. A program corresponding to the flow chart shown in FIG. 2 is stored in a ROM of the control unit 112 and is executed by a CPU thereof.

S201: In response to a print instruction from the user, there is issued a print instruction to instruct a print operation.

S202: A processing circuit 18 in the main body 1 of the apparatus starts communication with a device executing the print instruction, and executes confirmation of conditions required for printing with the device executing the print instruction and, if necessary, image processing for converting image information into print information.

S203: When the preparation for printing is ready, the control means 19 drives the motor connected to the feeding roller 3 to start the feeding of the recording sheet P.

S204: After the detection of the leading end of the recording sheet, the printing is started by rotating the stepping motor by a predetermined number of steps. The print start position is taken at 12.465 mm, taking the leading end of the recording sheet as reference.

S205: The printing is executed by activating the thermal head and by rotating the stepping motor by 4 steps. The printing operation is terminated after rotation of 6776 steps (1694 lines) in total. The print end position in this example becomes 156.455 mm from the leading end of the recording sheet.

S206: Then, for the purpose of deceleration before stopping, the stepping motor is rotated for about 10 lines (corresponding to 40 steps) and is thereafter stopped.

S207: From the stopped state, the stepping motor is activated in the reverse direction to convey the recording sheet P in a direction opposite to that in the printing operation. After such reverse rotation by a predetermined number of steps (6776 steps—steps for deceleration), the stepping motor is further rotated for 10 lines (corresponding to 40 steps) for deceleration and is thereafter stopped.

S208: The above-described sequence is repeated three times for three colors of Y, M and C, thereby executing transfer printing of a desired image on the recording sheet P.

S209: Thereafter executed is the transfer of the overcoat layer for protecting the print surface.

S210: Thereafter the stepping motor is driven in the reverse direction to guide the recording sheet to the discharge rollers 3 which are then driven to discharge the recording sheet, whereupon the operation sequence is terminated.

In the foregoing description, the control means 19 is assumed to control the recording position by managing the number of rotation steps of the stepping motor in the entire printing operation based on a detection signal for the leading end of the recording sheet detected initially by the sensor 10 and on the relationship between the number of steps of the stepping motor and the position in the conveying operation of the recording sheet P, but such system is not restrictive and there may also adopted a configuration of managing the recording position by detecting the leading end of the recording sheet by a sensor positioned at the leading end portion of the recording sheet at the transfer recording of the Y, M, C colors and the overcoat layer and managing the number of rotation steps of the stepping motor based on such signal.

Also in the foregoing description, the transfer of the overcoat layer is assumed to be executed only by the on/off drive the thermal head, but there may also added such control as to gradually increase the amount of heat generation at the start of transfer of the overcoat layer and to gradually decrease the amount of heat generation at the end of transfer of the overcoat layer.

In the following there will be explained a print mode of the system.

FIG. 4 is a schematic view of the print system of the present invention in which the digital camera 29 and the main body 1 of the printer apparatus are connected by a USB cable 27.

Connection with a personal computer can be achieved by replacing the USB cable 27 connected to a connector 29 by a USB cable 28.

In the above-described configuration, the print instruction is given from the digital camera 28 or the host computer 30.

In the following there will be given a more detailed explanation on the communication of the printer apparatus, in the execution of the aforementioned print instruction in the step S202.

After the image pickup operation, the digital camera 29 holds the image information in an internal memory thereof. The memory is advantageously composed of a detachable memory such as a compact flash card or a smart media. There is assumed a case of setting the digital camera 29 at the reproduction mode and reproducing an arbitrary image. The reproduction of the image information can be confirmed at any time by a liquid crystal display provided on the digital camera 29, so that the user can call any taken image information.

In a state capable of communication with the main body 1 of the printer apparatus by the cable 27 or wireless means, the print instruction is given by a predetermined procedure whereupon the digital camera 29 transmits necessary information to the printer apparatus and a pint output is obtained from the main body 1 of the printer apparatus.

In the print system of the present invention, the image is selected in the digital camera and the printing is started in response to the print instruction from the digital camera.

In the print system of the present invention, the digital camera is shifted to the print mode by making connection between the digital camera and the printer apparatus. Also together with such mode shift, one of the button switches provided on the digital camera is shifted in function to a print mode setting button switch.

Also the printer apparatus is provided with means for varying the communication means based on the pin status in the connection of the communication means with the camera, and, in case such pin status in the connection of the communication means does not indicate the connection with a personal computer, the printer becomes a host and fetches the data from the camera, but, in case of a connection status with the personal computer, the printer becomes a function and serves as a printer for the personal computer.

In the print system of the present invention, as the printer is to be connected with the digital camera, the printer becomes the host and executes a fetching operation for the data from the camera.

<Configuration of Print System>

Figure 5:
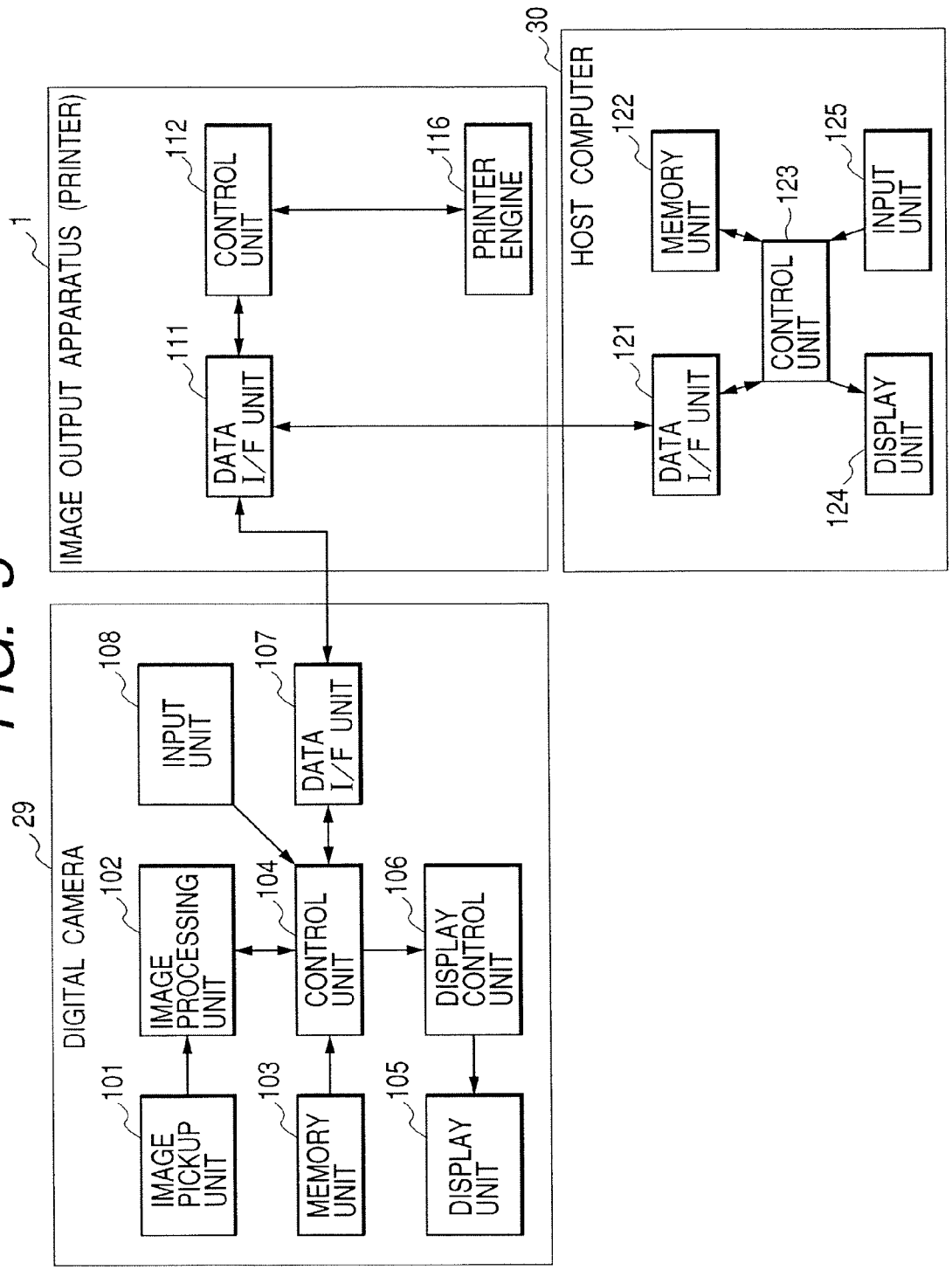
FIG. 5 is a schematic view showing the configuration of the first embodiment.

FIG. 5 is a block diagram of the print system composed by connecting the digital camera 29 and the printer 1 with the USB interface.

Referring to FIG. 5, the digital camera 29 obtains an image signal by image pickup operation by a CCD in an image pickup unit 101. The signal obtained by image pickup operation is subjected to a color conversion process, a filtering process etc. in an image processing unit 102, thereby converted into image data. The converted image data are stored in a memory unit 103, by a control unit 104 composed for example of a CPU, a ROM, a RAM etc. Then the control unit 104, in case of reproduction mode, reads the image data from the memory unit 103 and controls a display control unit 106 to display the image data on a display unit 105. Also in response to the print instruction from an input unit 108, the control unit 104 converts the image data stored in the memory unit 103 into data for the printer and transmits thus converted image data to a printer 118 through a data I/F unit 107. From the printer there are transmitted an identification signal, a status etc. of the printer through the data I/F unit 107.

The printer 1 is provided with a data I/F unit 111 for executing communication with the digital camera 29 and the host computer 30. A control unit 112 composed of a CPU, a ROM, a RAM etc. controls a printer engine to print the image data, received through the data I/F unit 111.

The host computer 30 such as a personal computer is composed of a data I/F unit 121 for executing communication with the digital camera 29 and the printer, a memory unit 122 such as a hard disk, a control unit 123 composed of a CPU, a ROM, a RAM etc., a display unit 124 such as a CRT display and an input unit 125 for entering data from a keyboard, a mouse etc.

Figure 6:
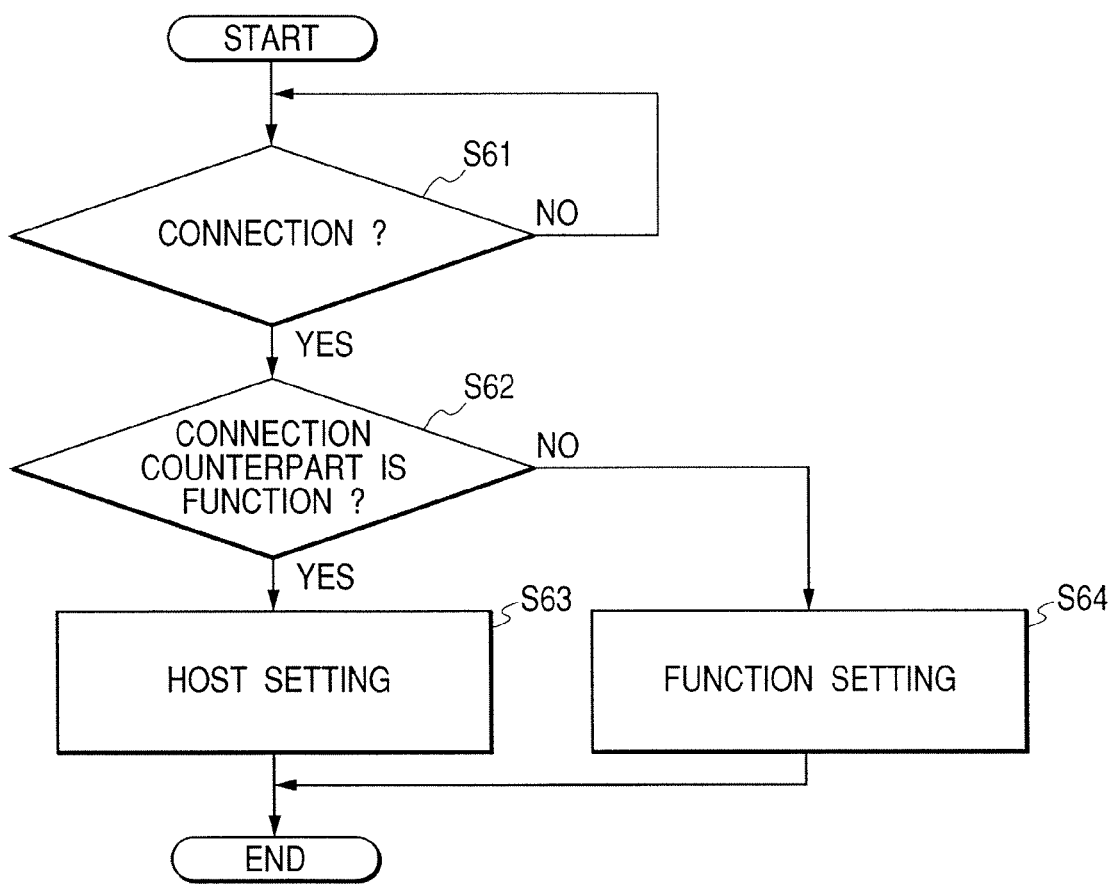
FIG. 6 is a flow chart 2 of the first embodiment.

FIG. 6 is a flow chart showing a process for switching whether the printer 1 functions as a host (master) or a function (slave) according to whether it is connected with the digital camera 29 or with the host computer. A program corresponding to the flow chart shown in FIG. 6 is stored in the ROM of the control unit 112 and is executed by the CPU thereof.

A step S61 discriminates the connection of the USB cable. If the USB cable is identified to be connected, the sequence proceeds to a step S62 for discriminating, based on the status of the connection pins, whether the connection is made with the cable 27 for connection with the digital camera serving as a function or with the cable 28 for connection with the host computer serving as a host. For example, if a specified pin, other than the pins used for the ordinary communication, is in a GND (ground) state, the counterpart of connection is identified as a function, but, if such specified pin is in a NOT CONNECTED state, the counterpart of connection is identified as a host.

In case the step S62 identifies that the counterpart of connection is a function, a step S63 so sets the printer as to become the host, but, in case the step S62 identifies that the counterpart of connection is not a function, a step S64 so sets the printer as to become the function.

In the following there will be explained the print sequence in case the step S63 sets the printer as the host, with reference to FIG. 7, which shows the communication flow between the printer and the digital camera in the print execution, in a case where the printer becomes the host (connection state with the digital camera).

Figure 7:
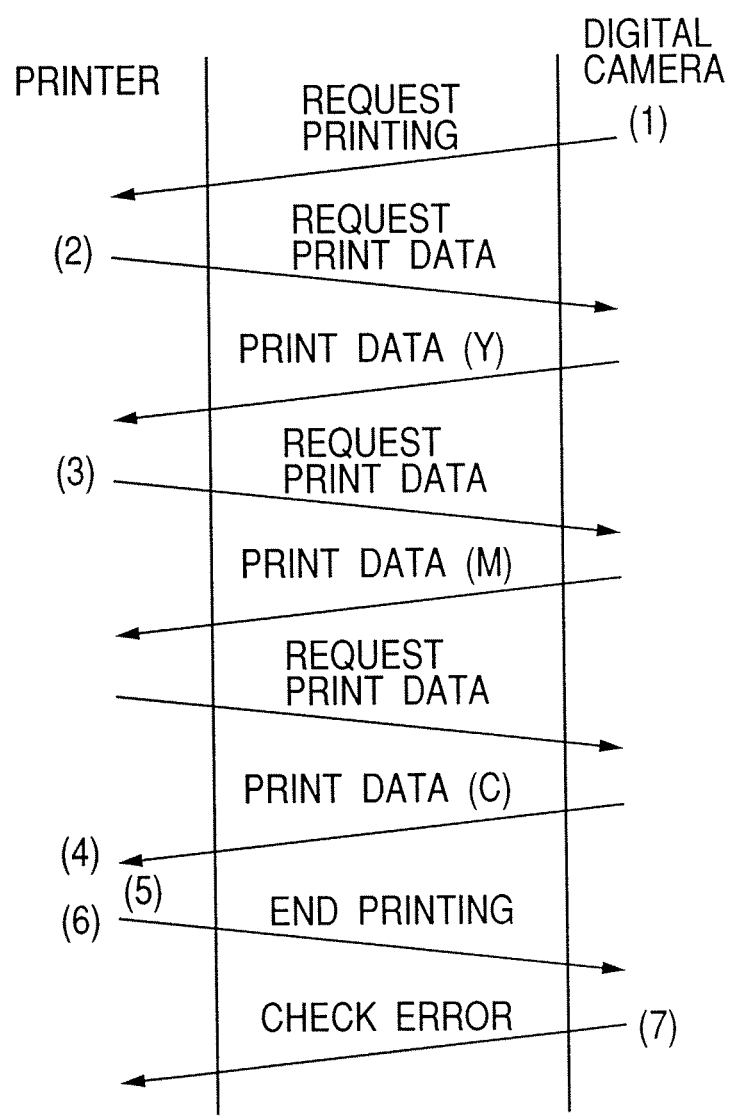
FIG. 7 is a view showing a sequence 1 of the first embodiment.

A program corresponding to the sequence shown in FIG. 7 and executed by the printer is stored in the ROM of the control unit 112 and is executed by the CPU thereof, while a program corresponding to the sequence executed by the digital camera is stored in the ROM of the control unit 104 and is executed by the CPU thereof.

As the user operates the present print system by the buttons of the camera, a trigger signal for the print operation is given from the camera (print request).

In response to the print request, the printer enters a printing operation, requests print data (Y) to the camera, and fetches and prints the data transmitted from the camera.

After receiving the necessary print data, the printer requests next print data (M) to the camera, and fetches and prints the data transmitted from the camera.

Then the printer similarly fetches and prints print data (C).

After printing the print data (C), the printer executes overcoating.

Upon completing the above-described procedure, the printer informs the camera of the end of printing.

Receiving information indicating the end of printing, the camera confirms that the anticipated operation have been completed, and informs the printer of such effect.

In the following there will be explained the print sequence in case the step S64 sets the printer as the function, with reference to FIG. 8, which shows the communication flow between the printer and the personal computer in the print execution, in a case where the printer becomes the function (connection state with the personal computer).

Figure 8:
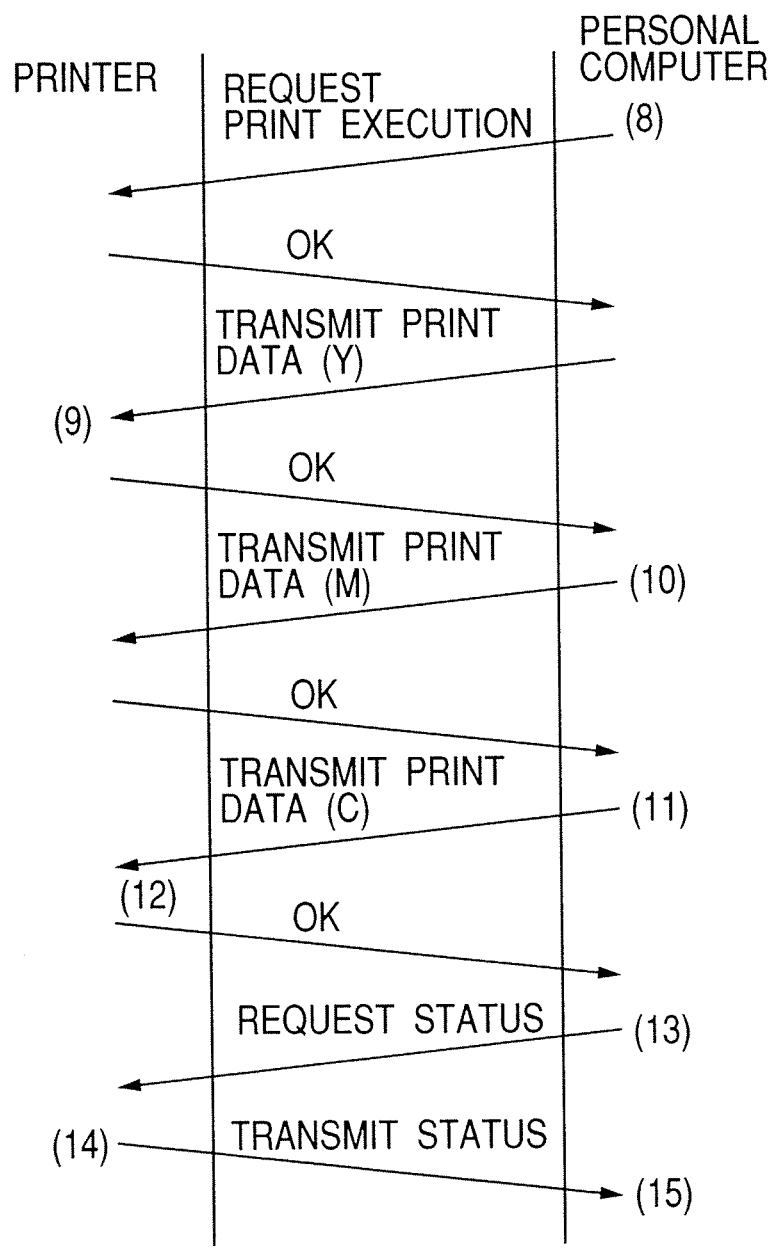
FIG. 8 is a view showing a sequence 2 of the first embodiment.

A program corresponding to the sequence shown in FIG. 8 and executed by the printer is stored in the ROM of the control unit 112 and is executed by the CPU thereof, while a program corresponding to the sequence executed by the personal computer is stored in the ROM of the control unit 123 and is executed by the CPU thereof.

As the user operates the present print system by the personal computer, a trigger signal for the print operation is given from the personal computer (print execution request).

In response to the print execution request, the printer enters a printing operation, and fetches and prints the print data (Y) transmitted from the personal computer.

After transmitting the necessary print data, the personal computer transmits next print data (M) to the printer, which fetches and prints such data. Similarly the personal computer transmits print data (C) to the printer, which fetches and prints such print data.

After printing the print data (C), the printer executes overcoating.

Upon completing transmission of necessary data, the personal computer requests status to the printer, thereby monitoring the function thereof.

Receiving status request, the printer transmits the status to the personal computer, and, upon completing the printing operation, transmits a status of such effect to the personal computer.

Receiving the status indicating the end of printing, the personal computer recognizes that the printing procedure has been terminated.

Since the printer can be switched as the host or as the function, the digital camera can be connected with the printer, not requiring a new USB terminal for USB connection with the printer but utilizing the USB terminal conventionally used for connection with the host computer.

Figure 9:
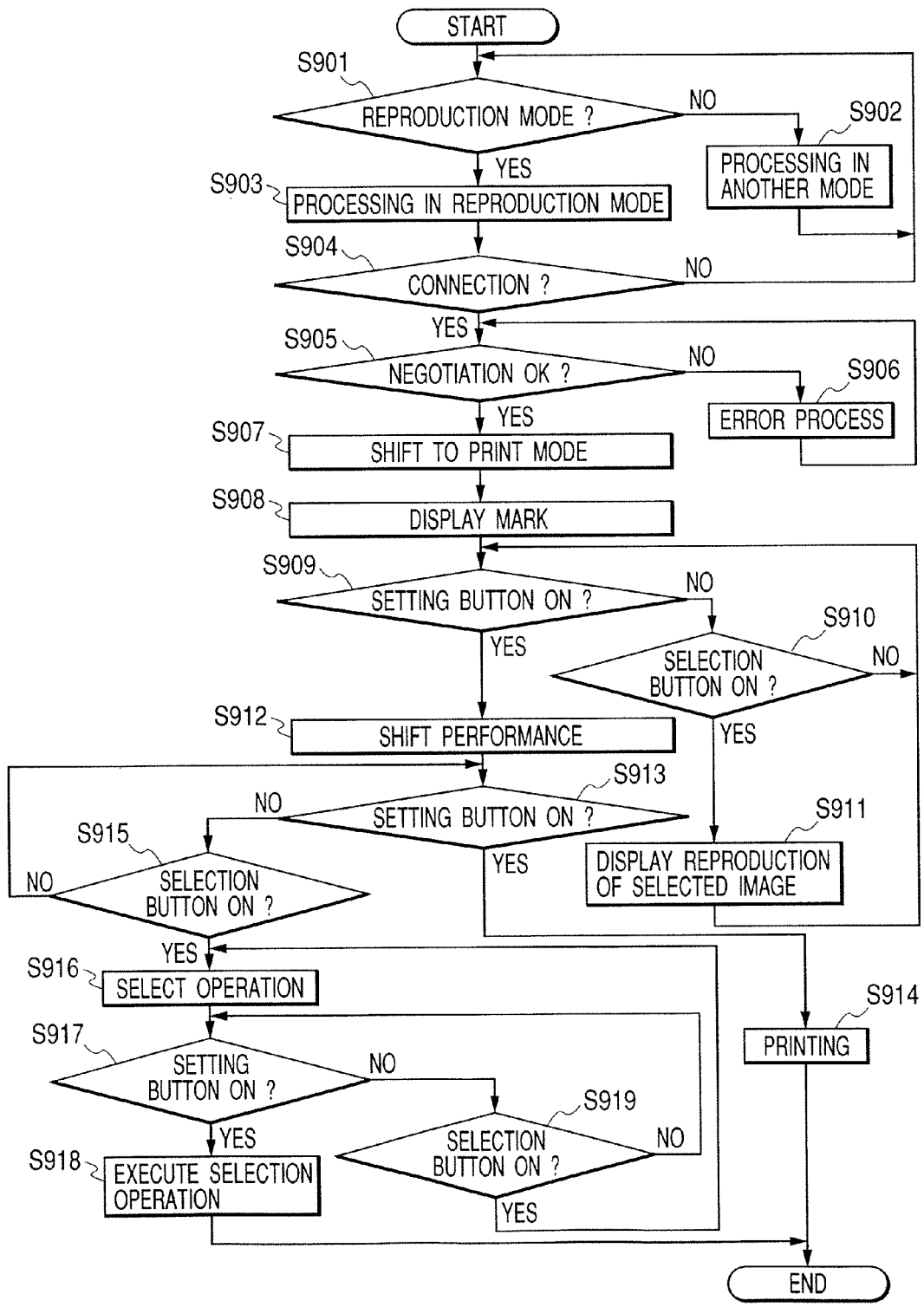
FIG. 9 is a flow chart 3 of the first embodiment.

FIG. 9 shows an example of shift from a connection state between the digital camera and the printer apparatus to the print mode of the digital camera. A program corresponding to the flow chart shown in FIG. 9 is stored in the ROM of the control unit 104 and is executed by the CPU thereof.

The shift to the print mode takes place from the reproduction mode state of the digital camera, but the shift to the print mode does not take place from the image pickup mode. Therefore, in the START and the END in FIG. 6, the digital camera is in the reproduction mode. In such state, the display means of the digital camera displays an image as shown in FIG. 7. Such image is selected by a selection button of the camera and is displayed. If the digital camera and the printer apparatus are connected in such state, the digital camera shifts to the print mode by the following procedure.

A step S901 discriminates whether the digital camera is in the reproduction mode. If the camera is for example set in the image pickup mode and is identified not in the reproduction mode, the sequence proceeds to a step S902 to executes a process in the set mode. In case the camera is identified to be in the reproduction mode, the sequence proceeds to a step S903 for executing a process in the reproduction mode. In the reproduction mode, there can be executed, for example, a process of switching the displayed image 1050 on the display unit 105 by the depression of arrow keys 1006, 1007 shown in FIG. 10. Also the mode can be switched by a mode switching switch 1001 shown in FIG. 1.

Then a step S904 discriminates whether the interface cable 27 is connected. If the connection is not identified, the sequence returns to the step S901, but, if the connection is identified, the sequence proceeds to a step S905 for discriminating whether the negotiation is OK. If OK, the sequence proceeds to a step S907, but, if not OK, the sequence proceeds to a step S906 for executing an error process.

Figure 11:
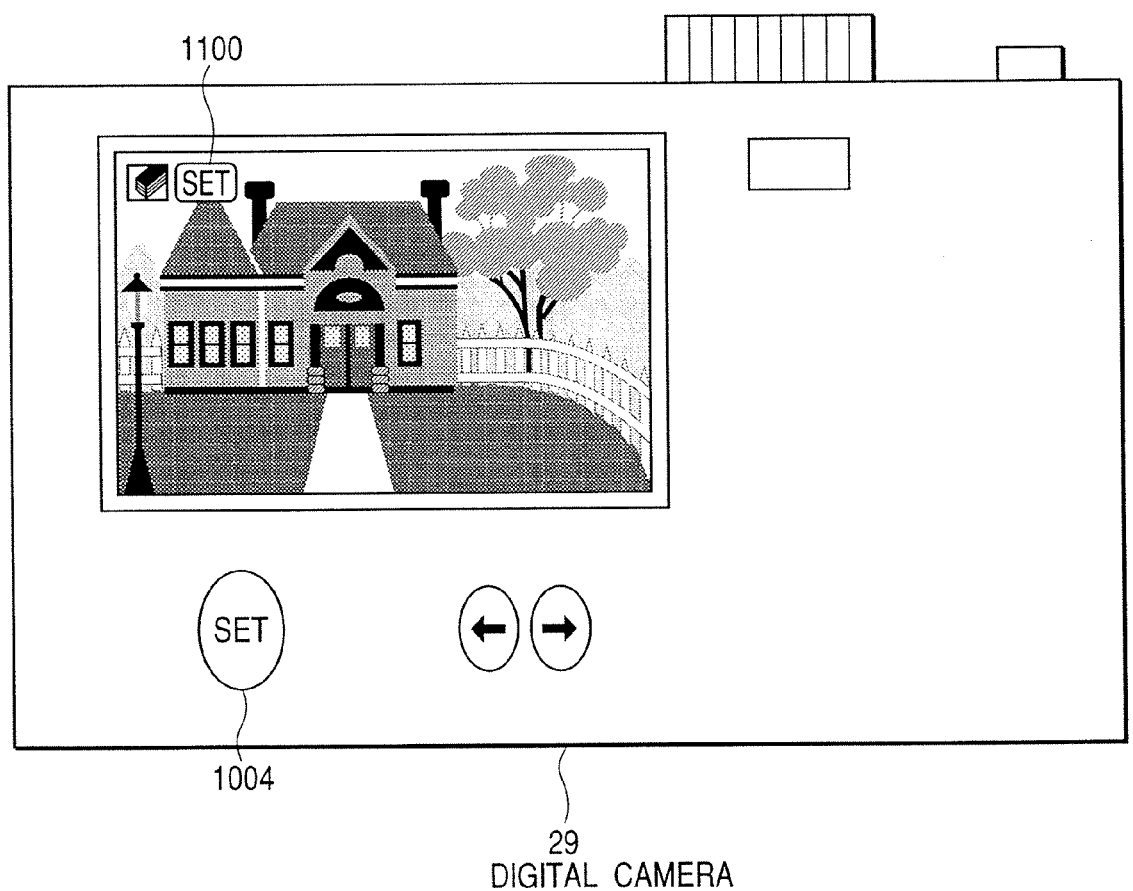
FIG. 11 is a view showing a display image 2 of the first embodiment.

A step S907 executes a shift to the print mode, and then the sequence proceeds to a step S908 for displaying a print mode mark 1100 shown in FIG. 11.

A step S909 discriminates whether a setting button 1004 has been depressed, and, if not, the sequence proceeds to a step S910 for discriminating the depression of arrow buttons 1006, 1007. Then a step S911 switches the displayed image 1005 according to the depression and executes processing in the reproduction mode.

Figure 12:
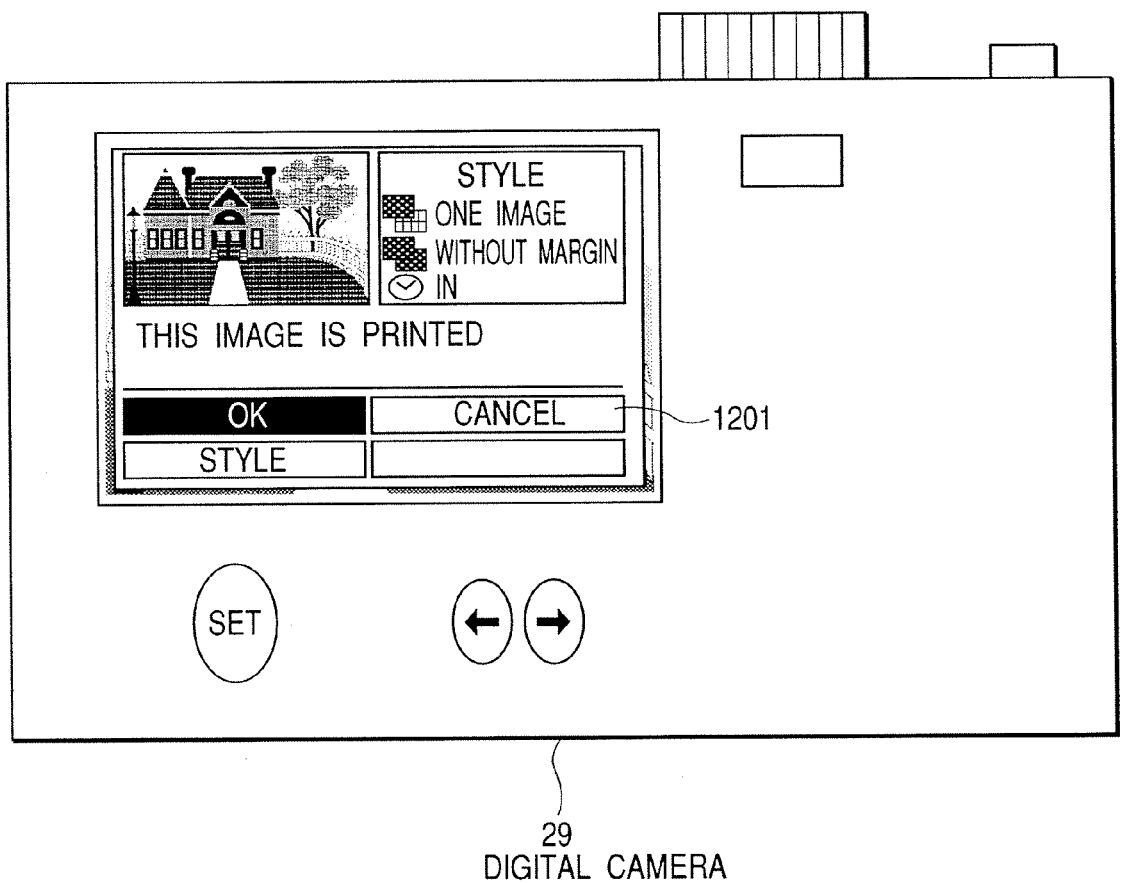
FIG. 12 is a view showing a display image 3 of the first embodiment.

In case the step S909 identifies that the setting button 1004 has been depressed, the sequence proceeds to a step S912 for displaying an image 1201 shown in FIG. 12 and indicating a shift state. Then, in case a step S913 identifies that the setting button has been depressed for the second time, the sequence proceeds to a step S914 for printing the display image 1050, displayed in a style set by the display image 1201.

In case the step S913 identifies that the setting button 1004 has not been depressed (NO), the user does not currently wish the execution of printing, so that the sequence proceeds to a step S915 for discriminating the depression of selection buttons 1006, 1007. In case the step S915 identifies that the selection button 1006 or 1007 has been depressed (YES), the sequence proceeds to a step S916 for selecting in succession operations (change of print style, cancellation of printing, and execution of printing) shown in FIG. 12 and displaying such selection by changing the tone of the display unit. Then the sequence proceeds to a step S917 for discriminating the depression of the setting button 1004. In case the selection buttons 1006, 1007 have not been depressed (NO), the user does not wish to change the currently selected operation, so that the sequence returns to the step S913 for discriminating the depression of the setting button 1004. In case a step S917 identifies that the setting button 1004 has been depressed (YES), the sequence proceeds to a step S918 for executing the operation selected by the step S916. In case it is identified that the setting button 1004 has not been depressed (NO), the user does not wish the execution of the currently selected operation, so that the sequence proceeds to a step S919 for discriminating again the depression of the selection buttons 1006, 1007. In case the step S919 identifies the depression of the selection button 1006 or 1007 (YES), the sequence returns to the step S916 for selecting in succession operations (change of print style, cancellation of printing, and execution of printing) shown in FIG. 12 and displaying such selection by changing the tone of the display unit. Then the sequence proceeds to a step S917 for discriminating the depression of the setting button 1004. In case it is identified that the selection buttons 1006, 1007 have not been depressed (NO), the user does not wish to change the currently selected operation, so that the sequence returns to the step S917 for discriminating the depression of the setting button 1004.

The above-described sequence allows the user to select a desired operation and a desired style, thereby obtaining the desired print.

Also by depressing the setting button 1004 twice after a style change, the user can print the display image 1050, currently displayed in the changed style.

In case the process of the program corresponding to the above-described flow chart identifies that the printer apparatus and the digital camera are capable of communication, the digital camera is shifted to the print mode.

Figure 10:
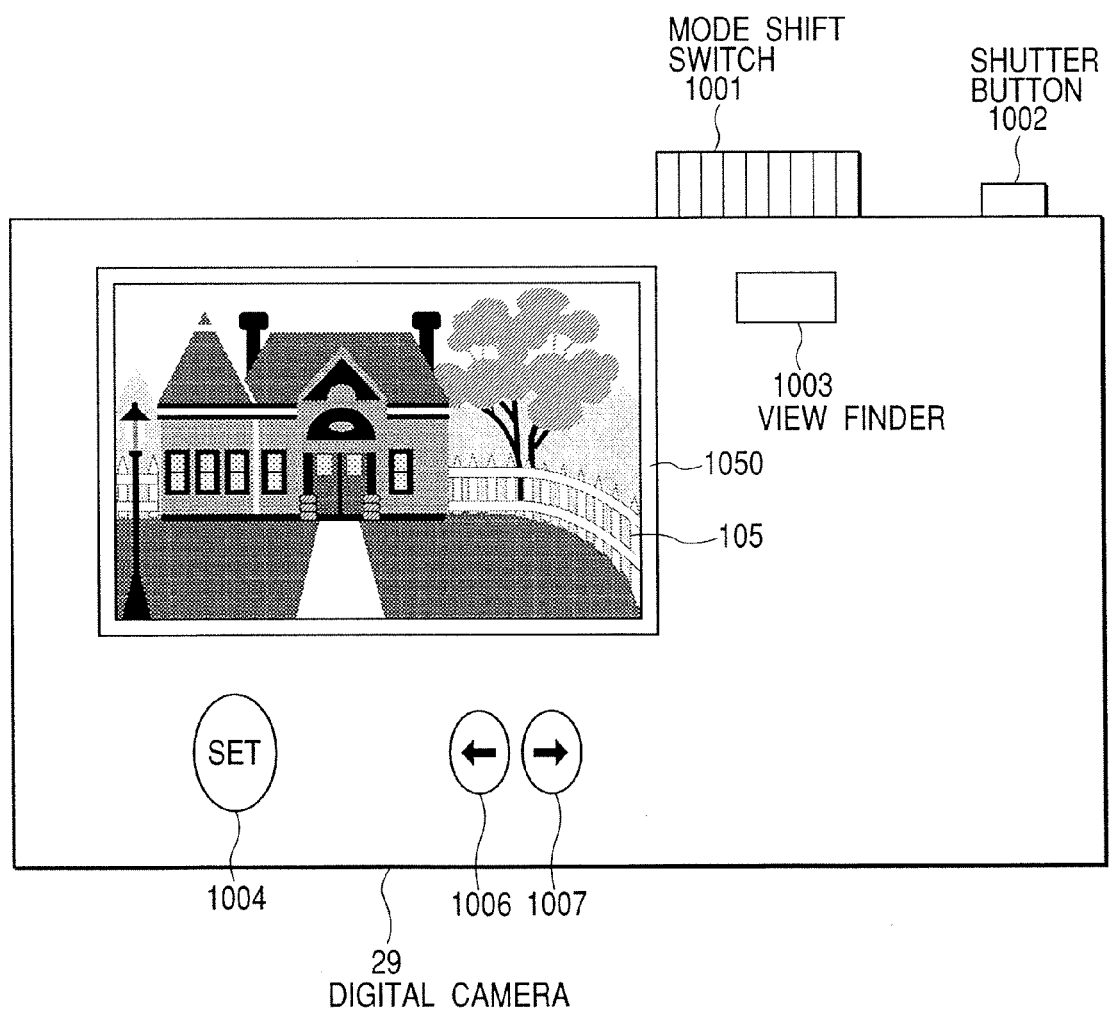
FIG. 10 is a view showing a display image 1 of the first embodiment.

In this state, the display unit of the digital camera displays an image shown in FIG. 11 instead of the image shown in FIG. 10. As shown in FIG. 11, there is displayed, in addition to the display image shown in FIG. 10, a mark 1100 indicating that the digital camera is currently in the print mode. For the purpose of explanation, such state is defined as an initial state of shifting to the print mode. In such state, the displayed image can be selected by the selection button of the camera as in the case of reproduction mode, and the selected image is displayed on the display unit. Such displayed image is printed in the present print system.

In such state, the setting button which does not perform any function when singly depressed in the reproduction mode becomes a print mode setting button, of which depression from this state shifts the control state to a state for providing the print instruction. Upon shifting to such state, the display means of the camera displays an image shown in FIG. 12. In the print system of the present invention, there can be executed selection of the printing operation, cancellation of printing or printing method as shown in FIG. 12. The operations can be selected by the aforementioned selection button. The selected operation is displayed in a different manner from other operations. In this state, the selected operation is executed by the depression of the print mode setting button.

In the print system of the present invention, in a shifted state from the initial state of the print mode by the depression once of the print mode setting button, the printing operation is always selected as a default so that the printing operation is executed by depressing the print mode setting button again in this state.

Therefore the desired image can be printed by connecting the digital camera and the printer in the reproduction mode state and depressing the setting button, provided on the camera, twice in succession.

Also in the aforementioned shifted state, the printing can be canceled by selecting the cancellation of printing by the selection button and by depressing the setting button, whereupon the system returns to the initial state of the print mode.

Also by selecting the selection of the printing method and depressing the setting button for executing such operation, the control state is further shifted to a state capable of selecting one of the plural printing methods set in the present invention, whereby the selection of the printing method can be executed. From such state, the aforementioned shifted state can be restored by depressing a mode button which is one of the buttons provided on the camera. The printing methods selectable in the print system of the present invention are printing with margin, printing without margin and 8-divided seal printing.

The above-mentioned sequences executed in the print system of the present invention are all programmed in advance in the control unit to execute the aforementioned operations by the control unit.

As explained in the foregoing, according to an embodiment of the present invention there is provided a print system consisting of a camera provided with image pickup means for converting the optical image of a picked-up object field into an electronic image signal, recording means for recording the signal, photoelectrically converted by the image pickup means, on a recording element, reproduction means for reproducing the electrical signal recorded on the recording element, display means for displaying the image reproduced by the reproduction means, and a printer apparatus for visible print output of the electronic image signal picked up by the camera, and communication means for executing communication between the aforementioned camera and the aforementioned printer apparatus in which the control means is shifted to a print mode in response to the connection of the camera and the printer apparatus by the communication means, wherein means is provided for shifting the function of one of button switches provided on the camera to a print mode setting button in the print mode, and, the print mode includes a sequence of shifting, by the depression of the print mode setting button in an initial state after shift of the control means to the print mode, to a state for selecting plural operations including the printing operation, cancellation of printing and selection of the printing method by the depression of a selection button provided on the camera and for executing the selected operation by the depression of the print mode setting button and the control means has a default setting capable of printing an image displayed on the display means of the camera in the initial state after shift to the print mode whereby the printing operation is started, in the initial state after shift to the print mode, by the depression of the print mode setting button twice in succession. It is thus rendered possible to print a desired image thereby obtaining a print of the desired image in a simple manner by connecting the digital camera and the printer in the reproduction mode state and depressing the setting button, provided on the camera, twice in succession.

In the foregoing embodiment, the printer engine is assumed to be composed of a thermal sublimation printer, but there can also be employed the printer engine of other types such as an ink jet printer.

The present invention can provide a camera capable of shifting to the print mode by the connection of a printer and also capable of providing a print in a simple manner in such mode.

According to the present invention there is also provided a printer which does not require a camera, provided with a connector for connection with a host device, to be newly provided with a connector for connection with the printer.

What is claimed is:
1. A camera comprising:
   a setting unit that sets a selected one of a photographing mode and a reproduction mode;
   a first control unit that controls an image on a recording medium;
   an operation unit that selects an image to be displayed;
   a designation unit that designates printing of the image selected by said operation unit;
   a reproduction unit that, when said setting unit sets the reproduction mode, reads out the image stored on the recording medium, selected by said operation unit, and causes a display apparatus to display the read-out image;
   a detection unit that detects that a connection to a printer is established;
   a determination unit that negotiates with the printer in accordance with said detection unit detecting the connection with the printer before the printing is designated by said designation unit, thereby determining whether the printer is arranged so as to communicate with said camera; and
   a second control unit that controls the reproduction mode set by said setting unit so as to shift to a print mode in accordance with said determination unit determining, during the set reproduction mode, that the printer is arranged so as to communicate with said camera, and that controls the display apparatus in accordance with the reproduction mode shifting to the print mode to display, in addition to the image read out and displayed in the reproduction mode, a mark indicating that said camera has shifted to the print mode from the set reproduction mode, wherein the image which the display apparatus is caused to display can be changed in response to an operation performed on said operation unit while the mark is being displayed on the display apparatus, wherein the image, which is displayed on the display apparatus when printing is designated by said designation unit, is subjected to the printing, wherein said designation unit is a button arranged so as to, in the print mode, function as a button for designating shifting to a print condition setting screen and to, in the reproduction mode, not function as the button for designating shifting to the print condition setting screen, and wherein said designation unit is made functional as the button for designating shifting to the print condition setting screen in accordance with said second control unit controlling the display apparatus to indicate that the print mode is shifted to from the reproduction mode.

2. A camera according to claim 1, wherein if said detection unit detects that the connection is established, while the image selected by said operation unit is being displayed on the display apparatus, said second control unit superimposes the mark to be displayed on the image being displayed.

3. A camera according to claim 1, wherein if said designation unit designates printing after shifting to the printing mode, the display apparatus displays a printing method.

4. A camera according to claim 3, further comprising a change unit for changing the printing method after the display apparatus displays the printing method.

5. A control method of a camera comprising (a) a setting unit for setting a selected one of a photographing mode and a reproduction mode, (b) a recording unit for recording an image on a recording medium, (c) an operation unit for selecting an image to be displayed, and (d) a designation unit for designating printing of the image selected by the operation unit, said method comprising the steps of:

when the setting unit sets the reproduction mode, reproducing an image by reading out the image stored on the recording medium, selected by the operation unit, and causing a display apparatus to display the read-out image;

detecting that a connection to a printer is established;

negotiating with the printer in accordance with said detecting step detecting the connection with the printer before the printing is designated by the designation unit, thereby determining whether the printer is arranged so as to communicate with the camera; and controlling the reproduction mode set by the setting unit so as to shift to a print mode in accordance with said negotiating and determining step determining, during the set reproduction mode, that the printer is arranged so as to communicate with the camera, and controlling the display apparatus in accordance with the reproduction mode shifting to the print mode to display, in addition to the image read out and displayed in the reproduction mode, a mark indicating that the camera has shifted to the print mode from the set reproduction mode, wherein the image which the display apparatus is caused to display can be changed in response to an operation performed on the operation unit while the mark is being displayed on the display apparatus, and the image, which is displayed on the display apparatus when printing is designated by the designation unit, is subjected to the printing, wherein said designation unit is a button arranged so as to, in the print mode, function as a button for designating shifting to a print condition setting screen and to, in the reproduction mode, not function as the button for designating shifting to the print condition setting screen, and wherein said designation unit is made functional as the button for designating shifting to the print condition setting screen in accordance with said controlling step controlling the display apparatus to indicate that the print mode is shifted to from the reproduction mode.

6. A method according to claim 5, wherein if said detecting step detects that the connection is established, while the image selected by the operation unit is being displayed on the display apparatus, said controlling step superimposes the mark to be displayed on the image being displayed.

7. A method according to claim 5, further comprising displaying a printing method on the display apparatus, if the designation unit designates printing after shifting to the printing mode.

8. A method according to claim 5, further comprising changing the printing method after the display apparatus displays the printing method.

9. A camera comprising:

setting means for setting a selected one of a photographing mode and a reproduction mode;

recording means for recording an image on a recording medium;

operation means for selecting an image to be displayed;

designation means for designating printing of the image selected by said operation means;

reproduction means for, when said setting means sets the reproduction mode, reading out the image stored on the recording medium, selected by said operation means, and causing a display apparatus to display the read-out image;

detection means for detecting that a connection to a printer is established;

determination means for negotiating with the printer in accordance with said detection means detecting the connection with the printer before the printing is designated by said designation means, thereby determining whether the printer is arranged so as to communicate with said camera; and control means for controlling the reproduction mode set by said setting means so as to shift to a print mode in accordance with said determination means determining, during the set reproduction mode, that the printer is arranged so as to communicate with said camera, and for controlling the display apparatus in accordance with the reproduction mode shifting to the print mode to display, in addition to the image read out and displayed in the reproduction mode, a mark indicating that said camera has shifted to the print mode from the set reproduction mode, wherein the image which the display apparatus is caused to display can be changed in response to an operation performed on said operation means while the mark is being displayed on the display apparatus, wherein the image, which is displayed on the display apparatus when printing is designated by said designation means, is subjected to the printing, wherein said designation means is a button arranged so as to, in the print mode, function as a button for designating shifting to a print condition setting screen and to, in the reproduction mode, not function as the button for designating shifting to the print condition setting screen, and wherein said designation means is to be made functional as the button for designating shifting to the print condition setting screen in accordance with said control means controlling the display apparatus to indicate that the print mode is shifted to from the reproduction mode.

\* \* \* \* \*